(12) United States Patent
Ackerman et al.

(10) Patent No.: US 8,255,432 B2
(45) Date of Patent: Aug. 28, 2012

(54) MECHANISM FOR SUPPORTING INDEXED TAGGED CONTENT IN A GENERAL PURPOSE DATA STORE

(75) Inventors: Mark D. Ackerman, Eagle Mountain, UT (US); Nadeem Ahmad Nazeer, Orem, UT (US); Stephen R. Carter, Spanish Fork, UT (US)

(73) Assignee: Oracle International Corporation, Redwood City, CA (US)

( * ) Notice: Subject to any disclaimer, the term of this patent is extended or adjusted under 35 U.S.C. 154(b) by 705 days.

(21) Appl. No.: 11/932,682

(22) Filed: Oct. 31, 2007

(65) Prior Publication Data
US 2008/0059514 A1 Mar. 6, 2008

Related U.S. Application Data

(62) Division of application No. 10/721,587, filed on Nov. 24, 2003, now Pat. No. 7,426,516.

(51) Int. Cl.
*G06F 17/00* (2006.01)
(52) U.S. Cl. .......................... 707/809; 707/807; 715/239
(58) Field of Classification Search ............. 707/6, 100, 707/101, 103 R, 103 X, 103 Y, 103 Z, 803, 707/806–812, 635, 639, 657, 999.1, 181, 707/E17.118, 790, 791, 793; 715/234, 235, 715/236, 237, 239, 241, 242
See application file for complete search history.

(56) References Cited

U.S. PATENT DOCUMENTS

| | | | |
|---|---|---|---|
| 5,797,137 A | 8/1998 | Golshani et al. | |
| 6,546,394 B1 | 4/2003 | Chong et al. | |
| 6,708,186 B1 | 3/2004 | Claborn et al. | |
| 6,766,326 B1 * | 7/2004 | Cena | 707/101 |
| 7,007,033 B1 * | 2/2006 | Rothschiller et al. | 1/1 |
| 7,174,327 B2 * | 2/2007 | Chau et al. | 1/1 |
| 7,287,216 B1 * | 10/2007 | Lee et al. | 715/234 |
| 7,426,516 B1 | 9/2008 | Ackerman et al. | |
| 7,487,515 B1 * | 2/2009 | Jones et al. | 719/328 |
| 2002/0059187 A1 | 5/2002 | Delo et al. | |
| 2002/0169788 A1 | 11/2002 | Lee et al. | |

(Continued)

OTHER PUBLICATIONS

Sonic Extensible Information Server, "NIC Extensible Information Server", http://www.soncisoftware.com/products/additional_prod...; retrieved Aug. 25, 2004 (one page).
Sonic eXtensible Information Server, "Supported Platforms", http://www.sonicsoftware.com/products/additional_prod...; retrieved Aug. 25, 2004 (one page).

(Continued)

*Primary Examiner* — Greta Robinson
(74) *Attorney, Agent, or Firm* — Marger Johnson & McCollom PC

(57) ABSTRACT

A schema identifies a field in a document as a key field. Using an XML schema, the key field can be identified by attaching a property to the element or attribute to be used as a key field (if the XML schema standard is modified to support properties). Otherwise, attributes can be used to identify the element or attribute that is to be a key field. Fields can be primary keys, secondary keys, or foreign keys, as supported by data stores. The data store can analyze the schema to determine which fields are key fields. The key fields can be duplicated in the native format of the data store for use in indexing, searching, and other data store functions on the documents. The documents themselves can be stored as objects, into which the data store cannot reach, or can be stored in the native format of the data store, as desired.

4 Claims, 20 Drawing Sheets

U.S. PATENT DOCUMENTS

| | | | |
|---|---|---|---|
| 2003/0140027 A1 | 7/2003 | Huttel et al. | |
| 2003/0149934 A1* | 8/2003 | Worden | 715/513 |
| 2003/0163479 A1 | 8/2003 | Mathews et al. | |
| 2004/0015783 A1* | 1/2004 | Lennon et al. | 715/523 |
| 2004/0068694 A1 | 4/2004 | Kaler et al. | |
| 2004/0068696 A1* | 4/2004 | Seyrat et al. | 715/513 |
| 2004/0143581 A1* | 7/2004 | Bohannon et al. | 707/100 |
| 2005/0021536 A1 | 1/2005 | Fiedler et al. | |
| 2005/0055355 A1 | 3/2005 | Murthy et al. | |
| 2005/0060647 A1* | 3/2005 | Doan et al. | 715/514 |
| 2005/0125720 A1* | 6/2005 | Little et al. | 715/513 |
| 2005/0132276 A1* | 6/2005 | Panditharadhya et al. | 715/513 |
| 2005/0228800 A1 | 10/2005 | Dettinger et al. | |
| 2006/0173868 A1 | 8/2006 | Angele et al. | |

OTHER PUBLICATIONS

Sonic eXtensible Information Sever Features, "Technical Overview", http://www.sonicsoftware.com/products/additional_prod...; retrieved Aug. 25, 2004, pp. 1-2.

Bourret et al., "A Generic Load/Extract Utility for Data Transfer Between XML Documents and Relational Databases"; Advanced Issues of E-Commerce and Web-Based Information Systems; WECWIS 2000; Jun. 8-9, 2000; pp. 134-143.

Klein, Michel, "Interpreting XML Documents via an RDF Schema Ontology"; Proceedings of the 13th International Workshop on Database and Expert Systms Applications; 2002; pp. 1-5.

SonicXIS, "Sonic Extensible Information Server"; 2003; 8 pages.

* cited by examiner

```xml
<?xml version="1.0"?>
<purchaseOrder orderDate="1999-10-20">
   <shipTo country="US">
      <name>Alice Smith</name>
      <street>123 Maple Street</street>
      <city>Mill Valley</city>
      <state>CA</state>
      <zip>90952</zip>
   </shipTo>
   <billTo country="US">
      <name>Robert Smith</name>
      <street>8 Oak Avenue</street>
      <city>Old Town</city>
      <state>PA</state>
      <zip>95819</zip>
   </billTo>
   <comment>Hurry, my lawn is going wild!</comment>
   <items>
      <item partNum="872-AA">
         <productName>Lawnmower</productName>
         <quantity>1</quantity>
         <USPrice>148.95</USPrice>
         <comment>Confirm this is electric</comment>
      </item>
   </items>
</purchaseOrder>
```

```
<note>
<to>Fred</to>
<from>Mary</from>
<heading>Reminder</heading>
<body>Don't forget me this weekend!</body>
</note>
```

```
<xsd:schema xmlns:xsd="http://www.w3.org/
2001/XMLSchema">

<xsd:annotation>
  <xsd:documentation xml:lang="en">
    Purchase order schema for Example.com.
    Copyright 2000 Example.com. All rights reserved.
  </xsd:documentation>
 </xsd:annotation>

<xsd:element name="purchaseOrder"
type="PurchaseOrderType"/>

<xsd:element name="comment" type="xsd:string"/>

<xsd:complexType name="PurchaseOrderType">
  <xsd:sequence>
   <xsd:element name="shipTo" type="USAddress"/
>
   <xsd:element name="billTo" type="USAddress"/>
   <xsd:element ref="comment" minOccurs="0"/>
   <xsd:element name="items"  type="Items"/>
  </xsd:sequence>
  <xsd:attribute name="orderDate" type="xsd:date"/
>
 </xsd:complexType>

```
⋮
<xsd:complexType name="USAddress">
 <xsd:sequence>
  <xsd:element name="name"   type="xsd:string"/>
  <xsd:element name="street" type="xsd:string"/>
  <xsd:element name="city"   type="xsd:string"/>
  <xsd:element name="state"  type="xsd:string"/>
  <xsd:element name="zip"    type="xsd:decimal"/>
 </xsd:sequence>
 <xsd:attribute name="country"
type="xsd:NMTOKEN"
    fixed="US"/>
</xsd:complexType>

<xsd:complexType name="Items">
 <xsd:sequence>
  <xsd:element name="item" minOccurs="0"
maxOccurs="unbounded">
   <xsd:complexType>
    <xsd:sequence>
     <xsd:element name="productName"
type="xsd:string"/>
     <xsd:element name="quantity">
      <xsd:simpleType>
       <xsd:restriction base="xsd:positiveInteger">
        <xsd:maxExclusive value="100"/>
       </xsd:restriction>
         ⋮
```

```xml
    </xsd:simpleType>
   </xsd:element>
   <xsd:element name="USPrice" type="xsd:decimal"/>
   <xsd:element ref="comment"   minOccurs="0"/>
   <xsd:element name="shipDate" type="xsd:date" minOccurs="0"/>
   </xsd:sequence>
   <xsd:attribute name="partNum" type="SKU" use="required"/>
  </xsd:complexType>
 </xsd:element>
 </xsd:sequence>
 </xsd:complexType>

<!-- Stock Keeping Unit, a code for identifying products -->
 <xsd:simpleType name="SKU">
  <xsd:restriction base="xsd:string">
   <xsd:pattern value="\d{3}-[A-Z]{2}"/>
  </xsd:restriction>
 </xsd:simpleType>

</xsd:schema>
```

FIG. 2C
(Prior Art)

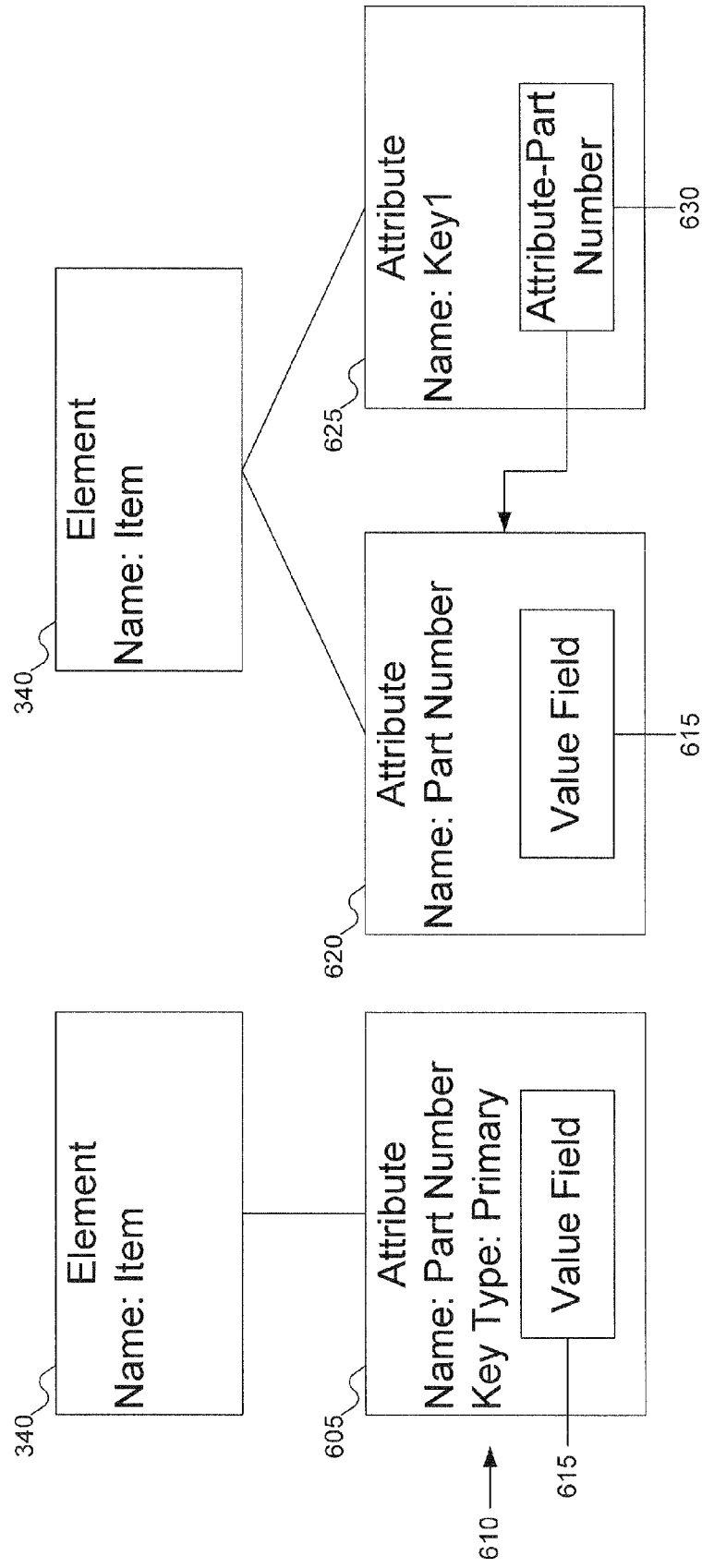

MECHANISM FOR SUPPORTING INDEXED TAGGED CONTENT IN A GENERAL PURPOSE DATA STORE

RELATED APPLICATION DATA

This patent application is a divisional of U.S. patent application Ser. No. 10/721,587, filed Nov. 24, 2003, now U.S. Pat. No. 7,426,516, issued Sep. 16, 2008 which is hereby incorporated by reference for all purposes.

This patent application is related to U.S. patent application Ser. No. 11/932,597, filed Oct. 31, 2007, which is a divisional of U.S. patent application Ser. No. 10/721,587, filed Nov. 24, 2003, now U.S. Pat. No. 7,426,516, issued Sep. 16, 2008, and is hereby incorporated by reference for all purposes.

FIELD OF THE INVENTION

This invention pertains to data stores, and more particularly to data store operations on tagged file formats such as eXtensible Markup Language (XML) documents.

BACKGROUND OF THE INVENTION

Databases, in their various forms, have a long history within computer science. Early databases were files customized for use with specific applications. The application was responsible for the organization of the data in the file, for searching the file, and for updating the file as needed.

Eventually, generalized database applications came into being. These applications included interfaces that allowed other applications to use the databases without having to manage the data directly. The programmer could define the structure of the database, add data, search the database, and perform other functions without having to be responsible for the implementation of the database itself.

As database applications have come into existence, their development paths have diverged. Where once there was only one type of database, there are now flat databases, relational databases, object-oriented databases, and other varieties. But all of these database models share a common problem: they store data in a format specific to the database model. There is no functionality to support storing and manipulating data in a generic format.

The inability of current database models to support generic data is especially problematic when databases are used to store eXtensible Markup Language (XML) documents. XML is a generalization of HyperText Markup Language (HTML), the format of documents used in surfing the World Wide Web on the Internet. XML documents, often defined using XML schemas or Data Definition Types (DDT), can include their own tag definitions, whose significance is determined by the application processing the document. (For more information about XML document structure, the reader is referred to the web site of the World Wide Web Consortium, at http://##www.w3.org; specifically, the reader is referred to http://##www.w3.org#XML. (In the Uniform Resource Locators (URLs) above and below, the forward slash marks ("/") have been replaced with pound signs ("#") to avoid document scanning problems.)) For example, FIGS. 1A-1B show two different XML documents. XML document 105 is a document storing a purchase order for a lawnmower; XML document 110 is a document storing a quick note. (XML document 105 is adapted from an example found at http://##www.w3.org#TR#xmlschema-0# (Copyright®2001 World Wide Web Consortium, (Massachusetts Institute of Technology, Institut National de Recherche en Informatique et en Automatique, Keio University), All Rights Reserved.); XML document 110 is adapted from an example found at http://##www.w3 schools.com#xml#note.xml.) Note that the overall structures of XML documents 105 and 110 are similar, but the content (specifically, the tags used) have no similarity.

The reason that XML documents 105 and 110 are difficult to store in current database models is rooted in the adaptability that makes XML documents useful. The database can store XML documents in one of two ways. The database can store XML documents in the database native format, but doing so requires disassembling the XML document into constituent pieces that can be stored in the database native format, thereby destroying the value of the XML document format and codifying it in the rigid Data Definition Language (DDL) of the database, which is often very difficult to change in an enterprise. Or, the database can store the XML document as a field in a record, retaining the format of the XML document but sacrificing the value the database can add to the organization of the data.

To help make this problem clearer, consider XML document 110 in FIG. 1B. XML document 110 describes a note. The note has four parts: the note's recipient, the note's sender, a heading for the note, and the body of text in the note. If the database stores these four elements separately in a table, then the database has broken the XML document into parts, and lost the significance of the XML document as a whole. On the other hand, if the database stores the XML document as a single object, then the database loses its normal functionality with respect to data. For example, the database cannot search for XML documents (such as XML document 110) sent by Mary: conventional database searching depends on the database storing data in the database native format.

Another complication is the concept of the attribute in an XML document. Attributes add functionality to XML documents, without changing the structure of the tags in the document. For example, in XML document 105 in FIG. 1A, the tag "purchaseOrder" includes the attribute "orderDate." Because databases currently do not handle attributes when processing XML documents stored in the database as a field, the databases ignore potentially critical information.

As can be seen from the above description, current data stores do not enable the utilization of database functionality (such as indexing for fast searching) while retaining the flexibility of a generic document. The invention addresses these problems and other in the art.

SUMMARY OF THE INVENTION

The invention includes a schema. The schema defines the acceptable structure for a document, and can also define the valid type and data values that a value can take on. The schema identifies a field that can be used as a key. The key can be identified as a property of a tag including the field, or can be identified by an attribute.

In one embodiment, a data store can access the schema for a document, to identify which field(s) are keys. The data store can then read the values of the key fields from the documents and store the key values in the native format of the data store. The keys can be used in processing the documents (e.g., by searching through the keys), while leaving the document in its original format for storage.

In another embodiment, the data store does not have access to the schema for a document and the fields to be used as keys are identified by special tag/value associations within the document.

BRIEF DESCRIPTION OF THE DRAWINGS

FIGS. 1A-1B show example XML documents.

FIGS. 2A-2C show a conventional XML schema, applicable to the XML document in FIG. 1A.

FIGS. 6A-6B show how attribute values can be identified as key fields in an XML document, according to an embodiment of the invention.

DETAILED DESCRIPTION OF THE EMBODIMENTS

Although eXtensible Markup Language (XML) documents, such as XML documents 105 and 110 in FIGS. 1A-1B, can be used to store data in almost any format, it is useful to have a defined format for documents used with particular applications. For example, the purchase order shown in XML document 105 of FIG. 1A can be used repeatedly, for different orders by different purchasers. To ensure that all documents used by the application meet the necessary format, an XML schema can be used.

A schema defines a class of documents. Essentially, a schema is a definition of the format a document should take if it is to satisfy the schema. FIGS. 2A-2C show an example XML schema, applicable to the XML document in FIG. 1A. XML schema 205 defines element types, attributes, and the structure appropriate for an XML document that is to be a purchase order document. A person skilled in the art will recognize that XML document 105 of FIG. 1A is merely exemplary of the class of XML documents defined by XML schema 205, and that there are near-infinite other XML documents that can satisfy XML schema 205. XML schema 205 is taken from http:##www.w3.org#TR#xmlschema-0#, which provides an excellent background document on XML schemas in general. (An example schema for the note document of FIG. 110 is not presented.)

Schemas in general, and XML schemas in particular, are typically stored in a computer system as a separate object. Schemas can also be stored remotely from the documents they classify. For example, in designing an application, the software engineer might use a standardized schema defined by another.

FIGS. 1A-1B do not include in the XML documents identifiers for the XML schemas that apply to the XML documents. A person skilled in the art will recognize that XML documents 105 and 110 can explicitly identify the XML schemas that apply to XML documents 105 and 110. When omitted from XML documents 105 and 110, it is up to the application to know which XML schema to apply.

Figure 3:
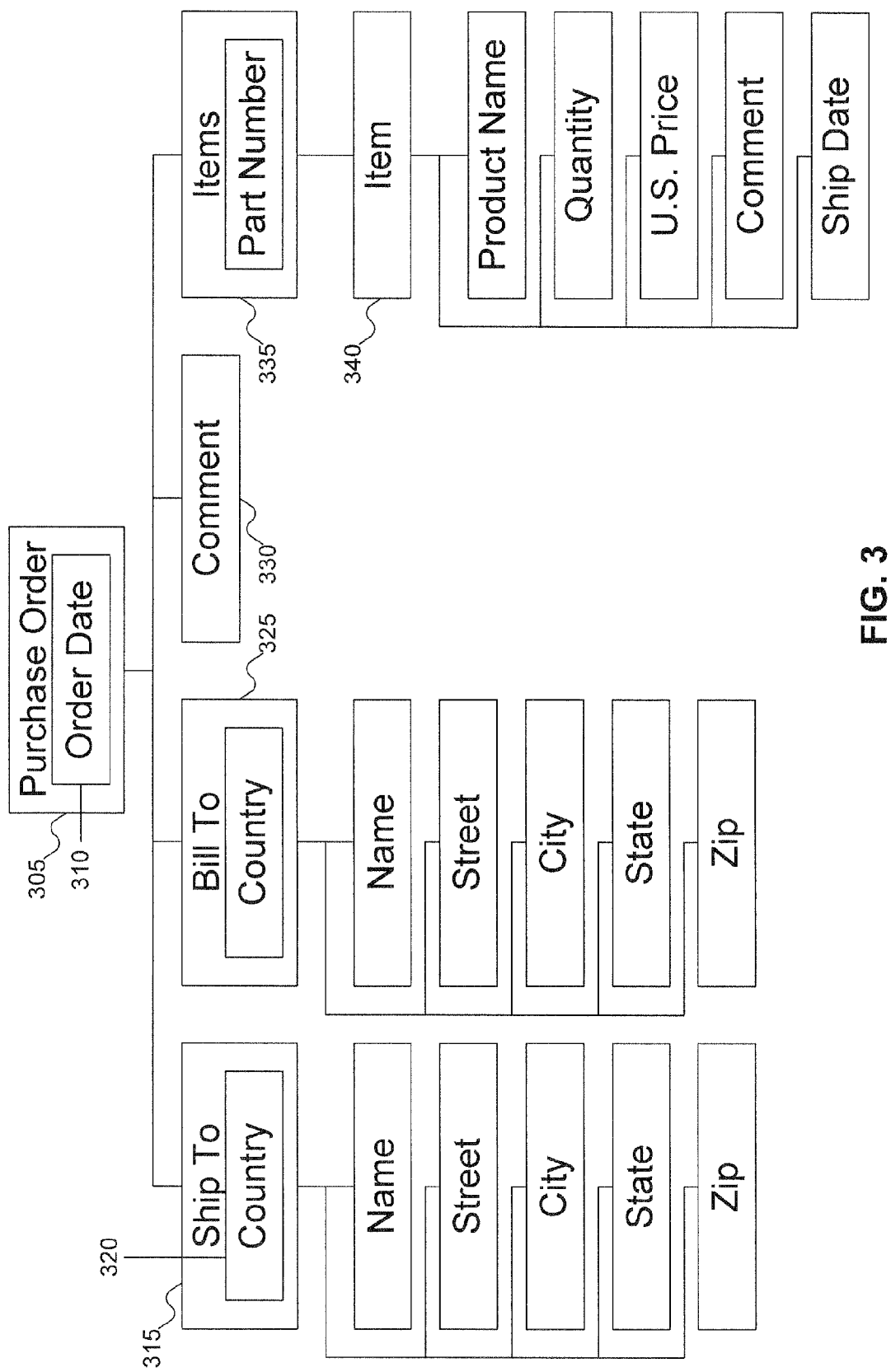
FIG. 3 shows a tree structure for the XML schema in FIGS. 2A-2C.

Because XML schema 205 in FIGS. 2A-2C is so long, it can be useful to see the structure of XML schema 205 in a different format. FIG. 3 shows XML schema 205 in a tree structure. For example, FIG. 3 shows that a purchase order includes Purchase Order element 305, which has Order Date attribute 310. Purchase Order element 305 includes four sub-elements: Ship To element 315 (which has Country attribute 320), Bill To element 325, Comment element 330, and Items element 335. Some elements can be used more than once: for example, Item element 340 (itself a complex type including four other elements) can occur any number of times. FIG. 3 is incomplete (for example, it does not indicate that Comment element 330 is optional), but it gives a general picture without being bogged down in details.

Like any language, XML includes a syntax. If the document does not satisfy the syntax, then the document cannot be parsed, meaning that the documents cannot be interpreted as XML documents. If an XML document satisfies the syntax, the document is said to be well-formed. But an XML document can be well-formed without satisfying an XML schema. For example, the XML document in FIG. 1A satisfies the XML schema in FIGS. 2A-2C, but the XML document in FIG. 1B does not. If an XML document satisfies an XML schema (i.e., the XML document adheres the data types, enumerations, facets, etc. of the XML schema), the XML document is said to be validated by the XML schema. A person skilled in the art will recognize that an XML document that is validated by an XML schema is necessarily well-formed, but a well-formed XML document might not be validated by an XML schema.

Figure 4:
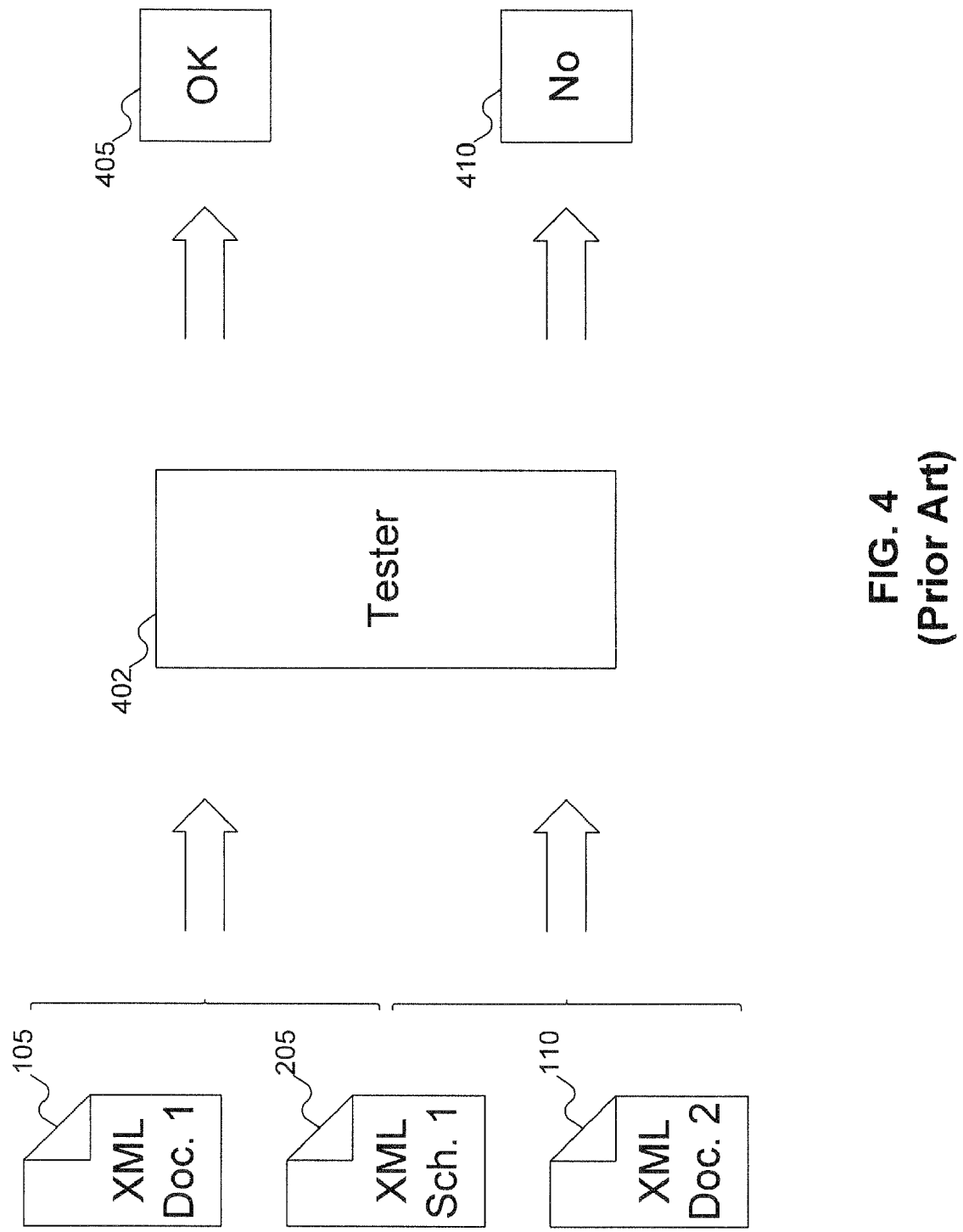
FIG. 4 shows the use of the XML schema of FIGS. 2A-2C to validate or reject the XML documents of FIGS. 1A-1B.

If an XML document is validated by an XML schema, then the application can be sure that the data in the XML document is in an expected format. If the XML document fails to satisfy the XML schema, then the application knows that it cannot expect the data to be useable. FIG. 4 illustrates these situations. In FIG. 4, XML documents 105 and 110 are tested to see if they satisfy XML schema 205. As indicated by results 405 and 410, XML document 105 satisfies XML schema 205; XML document 110 fails to satisfy XML schema 205. The testing methodology, not being pertinent to the present invention, is not described in further detail.

Now that background information about XML documents and schemas has been presented, embodiments of the invention can be explained. The basic idea is that certain fields within the XML schema can be flagged as key fields. When an XML document is to be added to the data store, the data store uses the XML schema to identify these key fields. (Throughout this document, the terms "data store" and "database" are considered interchangeable.) The key fields can be duplicated in the data store (i.e., copied from the document into the data store) in the data store native format, enabling the data store to perform regular data store operations on the XML document. The XML document itself remains unchanged.

A person skilled in the art will recognize the utility of embodiments of the invention as they pertain to XML documents. Given the flexibility (and the consequential near-limitless utility) of XML documents, any data store that can implement an embodiment of the invention with respect to XML documents can benefit. But a person skilled in the art will also recognize that embodiments of the invention are not limited to documents that use XML. Any general document format that supports the capability of identifying certain fields as key fields can be used. In addition, although the description below has the data store using the XML schema to identify the key field, a person skilled in the art will recognize that the data store can determine this information from the XML document itself, without reference to the related XML schema.

Returning to the embodiments extending the XML standard, there are two types of fields that can be used to identify key fields. These are the element and the attribute, both of which are used in defining new complex types in XML. Although this document is not the place for a complete primer on XML, an element can be thought of as an object in the XML document. Elements include a start tag and an end tag, blocking the content that is in the element. In contrast, an attribute can be thought of as a flag coupled to an element. Attributes cannot exist without an element. Attributes are included in the start tag for their element: they can be included in no other place. Referring back to FIG. 3 temporarily, Purchase Order 305 is an element; Order Date 310 is an attribute of the Purchase Order element.

Figures 5A, 5B:
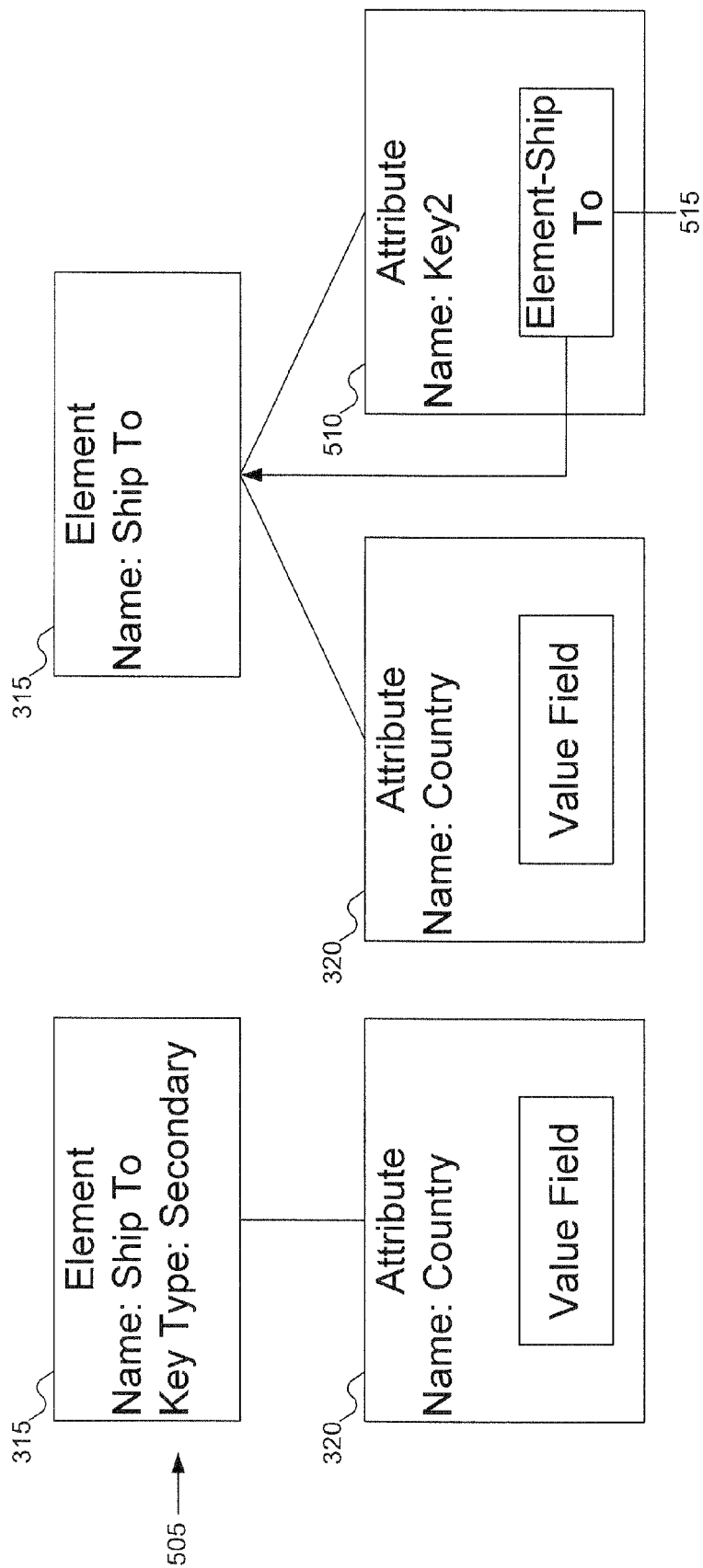
FIGS. 5A-5B show how element values can be identified as key fields in an XML document, according to an embodiment of the invention.

As there are two different types of objects in an XML schema that can be flagged as key fields, each object is discussed separately. FIGS. 5A-5B show how element values can be identified as key fields in an XML document, according to an embodiment of the invention. In FIG. 5A, Ship To element 315 is shown. As indicated above, Ship To element 315 includes Country attribute 320. Ship To element 315 also includes property 505, which defines Ship To element 315 as a secondary key field. (As ordinarily used in data store applications, primary keys, secondary keys, and foreign keys are all different ways to organize the data in the data store.) By making property 505 part of the definition of the element, the use of Ship To element 315 as a key field is immediately understood by all applications.

But to make property 505 part of the definition of the element, at least in XML schemas, requires modifying the standard for XML schemas. Currently, the standard for XML schemas does not support such a property. Until adopted into the standard, programmers may be unwilling to use property 505 to identify key fields, as they might be uncertain that the applications using the XML schemas can correctly parse property 505. Until property 505 is made part of the standard for the XML schema, programmers may prefer to identify the element as a key field using an attribute, as shown in FIG. 5B.

In FIG. 5B, Ship To element 315 is unchanged from the standard XML schema, nor is Country attribute 320 changed. Instead, a new Key2 attribute 510 is added to the definition of Ship To element 315. The name of Key2 attribute 510 ("Key2") identifies that the key represented by this attribute is the second key to be used. Key2 attribute 510 includes value field 515, which stores the value "Element-Ship To." This value refers the parser back to Ship To element 315 as storing the value to be used as an index for this key. In this manner, the parser knows what field is considered the key field for duplication purposes.

FIGS. 6A-6B show how attribute values can be identified as key fields in an XML document, according to an embodiment of the invention. FIGS. 6A-6B are very similar to FIGS. 5A-5B. In FIG. 6A, Item element 340 is shown, including Part Number attribute 605. Part Number attribute 605 includes property 610, indicating that value field 615 is to be the primary key in the data store.

As with FIG. 5A, FIG. 6A assumes that the XML schema standard has been modified to support key properties for attributes, and until attributes can have properties, FIG. 6B shows an alternative mechanism for identifying the key field. In FIG. 6B, attribute 620 is unmodified. Instead, element 340 has a second attribute: Key1 attribute 625. Key1 attribute 625 indicates that the key being identified is a primary key (as the key name is "Key1"), and stores the value "Attribute-Part Number", identifying (in value field 630) that Part Number attribute 620 stores the key value.

Although FIGS. 5B and 6B use particular names to identify the keys ("Key1," "Key2"), a person skilled in the art will recognize that other names can be used, provided the parser can recognize the names and interpret them correctly. For example, instead of using "Key 1" or "Key2" as the name of the attributes, the names could be "PrimaryKey," "Key(Secondary)," or any other name that can be recognized as representing a particular key type. So long as the parser can correctly identify the key type, the specific name used for the attribute is not significant.

Similarly, instead of using values "Element-Ship To" or "Attribute-Part Number," a person skilled in the art will recognize that the values of these attributes could be any value that recognizably identifies the element or attribute to be used as a key index. For example, since an attribute is associated with a specific element in the XML schema, the value for Key2 attribute 510 in FIG. 5B could be simply "Element." And, the value for Key1 attribute 625 in FIG. 6B could be simply "Attribute" (indicating that the immediately preceding attribute is to be used), or "Attribute 1" (indicating that the first attribute of the element lexically parsed in the XML document is to be used). (Of course, references, such as these, that are ambiguous out of context assume that the XML document stores the attributes in a predictable order, or forces a reliance on the declaration order in the XML schema). Again, so long as the parser can correctly identity the element or attribute to use as the source of the value for the key, the specific name used to identify the element or attribute is not significant.

Figure 7:
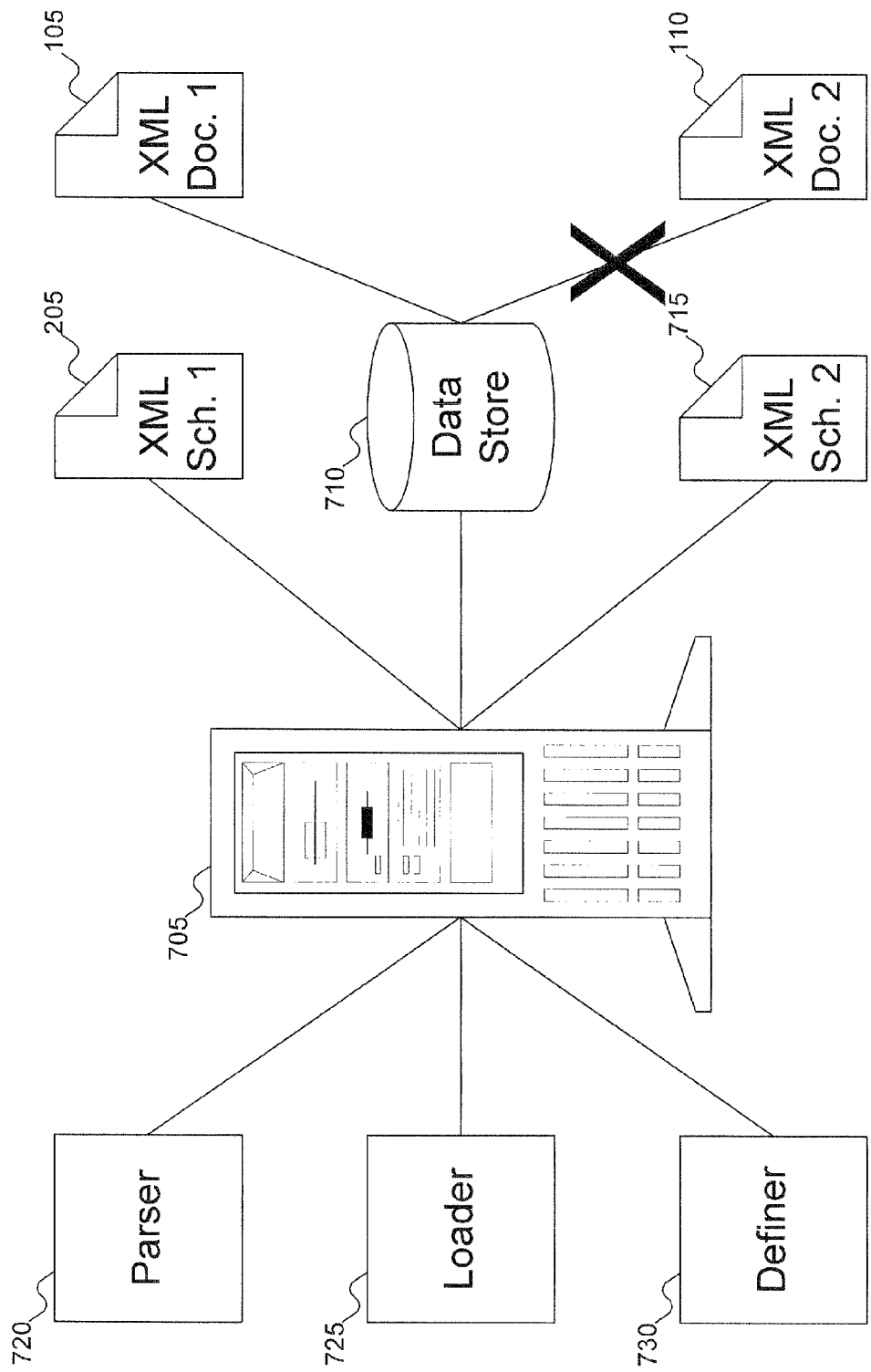
FIG. 7 shows a system including a data store that can store XML documents, according to an embodiment of the invention.

FIG. 7 shows a system including a data store that can store XML documents, according to an embodiment of the invention. In FIG. 7, computer 705 is shown. Computer 705 includes data store 710, which stores the various XML documents that satisfy XML schema 205. For example, data store 710 is shown as including XML document 105. Data store 710 does not include XML document 110, because XML document 110 does not satisfy XML schema 205 (it instead satisfies XML schema 715, whose specifics are not shown here). Note that although data store 710 does not store XML document 110 (because XML document 110 does not satisfy XML schema 205), there is no reason that another data store cannot XML document 110 (although such a data store would not be able to store XML document 105). An example of a data store that can be used as data store 710 is the Lightweight Directory Access Protocol (LDAP).

Computer 705 includes parser 720, loader 725, and definer 730. Parser 720 is responsible for parsing XML schema 205 to determine where the key field(s) in the XML schema can be found. This enables data store 710 to use loader 725 to load the values from the key fields in XML documents, for indexing and searching purposes (among others).

Definer 730 is used differently. Definer 730 can be used by computer 705 to define the structure of data store 710. For example, after parser 720 has determined the structure of the XML documents to be stored in data store 710, definer 730 can be used to define the data structures. Referring back to FIG. 3 momentarily, once parser has determined that, for example, the Ship To element includes five sub-elements and one attribute, the necessary data structures can be defined in data store 710 to support storage of data from Ship To elements. The use of parser 720 in combination with definer 730 enables the automatic definition of data base structures to store XML documents satisfying a particular XML schema.

Figure 8:
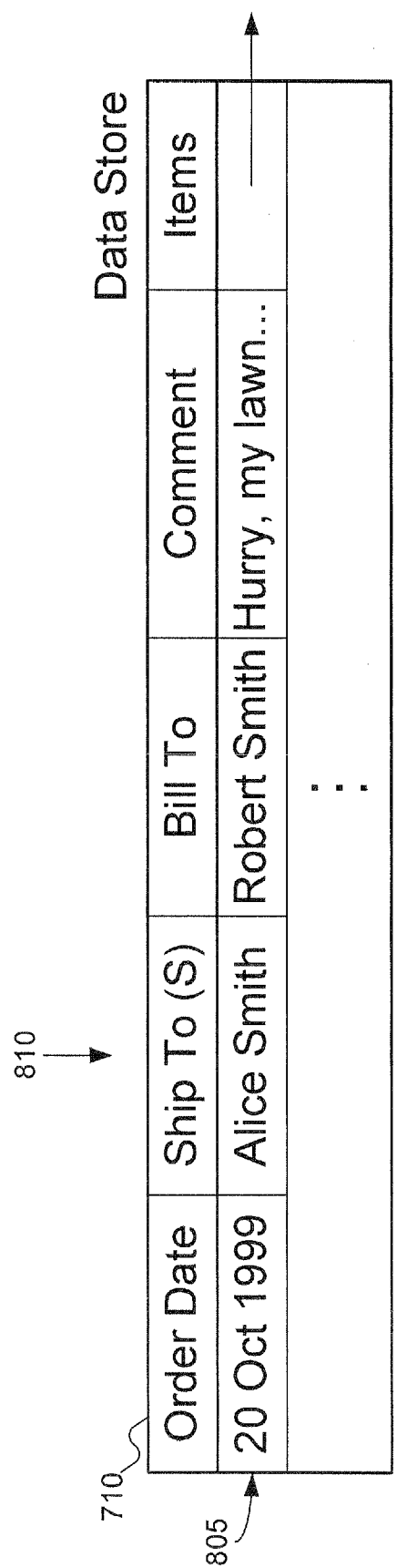
FIG. 8 shows a structure for the data store of FIG. 7, according to a first embodiment of the invention.

As discussed earlier, data store 710 can store the data in a native format, to support full data store operations. FIG. 8 shows a structure for the data store of FIG. 7, according to a first embodiment of the invention. In FIG. 8, a table from data store 710 is shown, with one entry 805. This entry shows the parsed information from XML document 105. For example, it shows the order date, the recipient of the order, the person to be billed, a comment, and a pointer to the items to be shipped. (For simplicity, only a portion of the data from XML document 105 is shown in FIG. 8.) Notice, for example, that column 810 is marked, as the Ship To element is the secondary key field.

Figure 9:
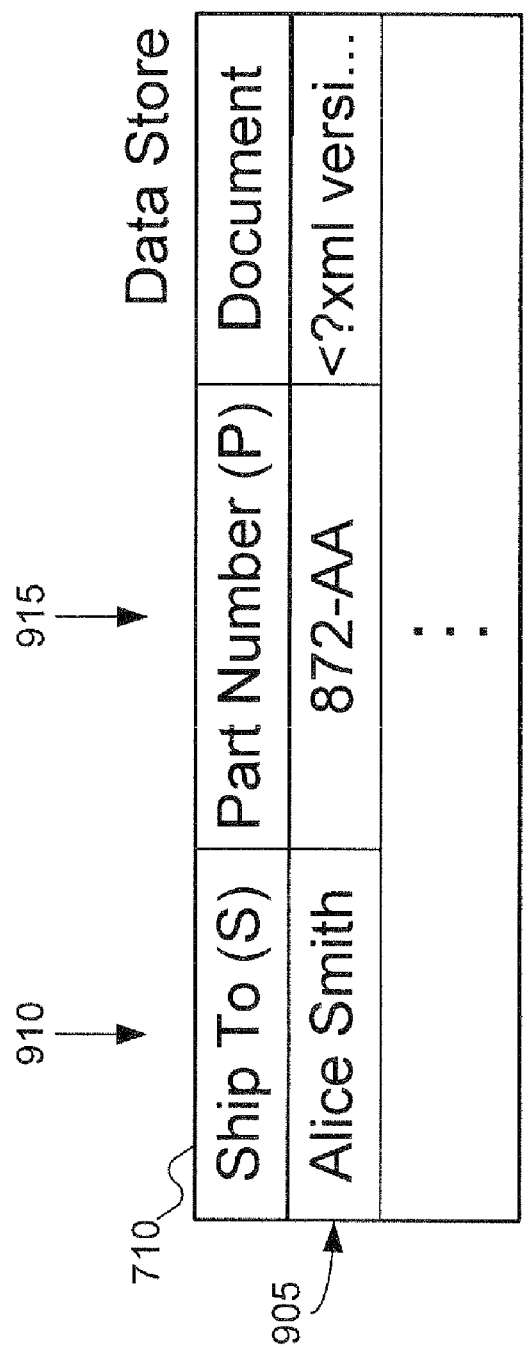
FIG. 9 shows a structure for the data store of FIG. 7, according to a second embodiment of the invention.

As discussed earlier, one problem with the prior art is that by storing the data in the native format of the database, the flexibility of the original XML documents is lost. FIG. 9 shows a structure for the data store of FIG. 7 that retains the flexibility of the original XML document, but takes advantage of the functionality of the data store, according to a second embodiment of the invention. In FIG. 9, entry 905 shows the document stored in its original format. Although the document is stored in a textual format, a person skilled in the art will recognize that other formats can be used. For example, if the document is a binary file, the document can be stored as a Binary Large OBject (BLOB). Notice also that in the embodiment of FIG. 9, data store 710 includes column 910, storing the duplicated Ship To data (which is the secondary key), and column 915, storing the Part Number (which is the primary key).

Figure 10A:
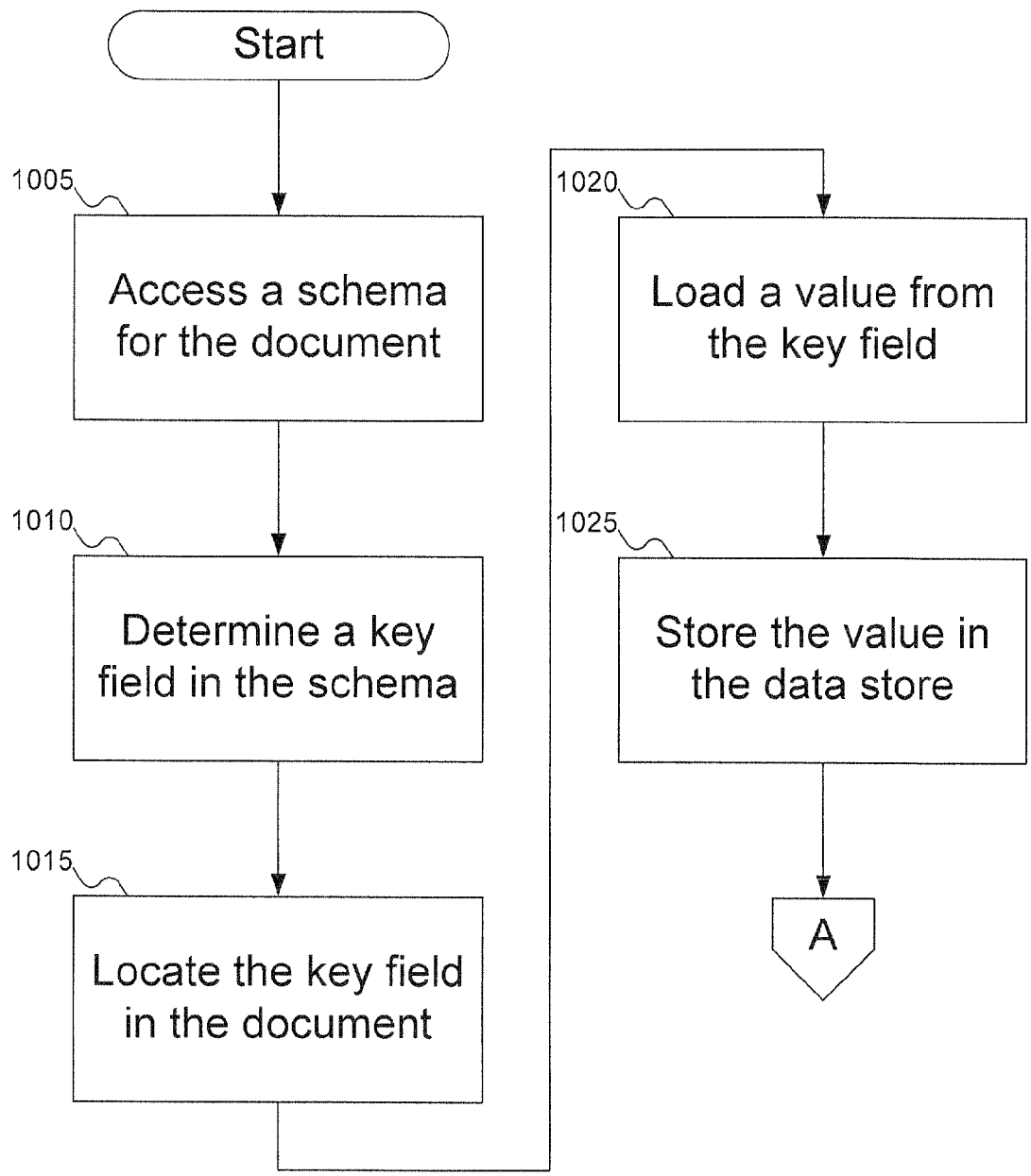
FIGS. 10A-10B show a flowchart of the procedure for storing a document in the data store of FIG. 7, according to an embodiment of the invention.
Figure 10B:
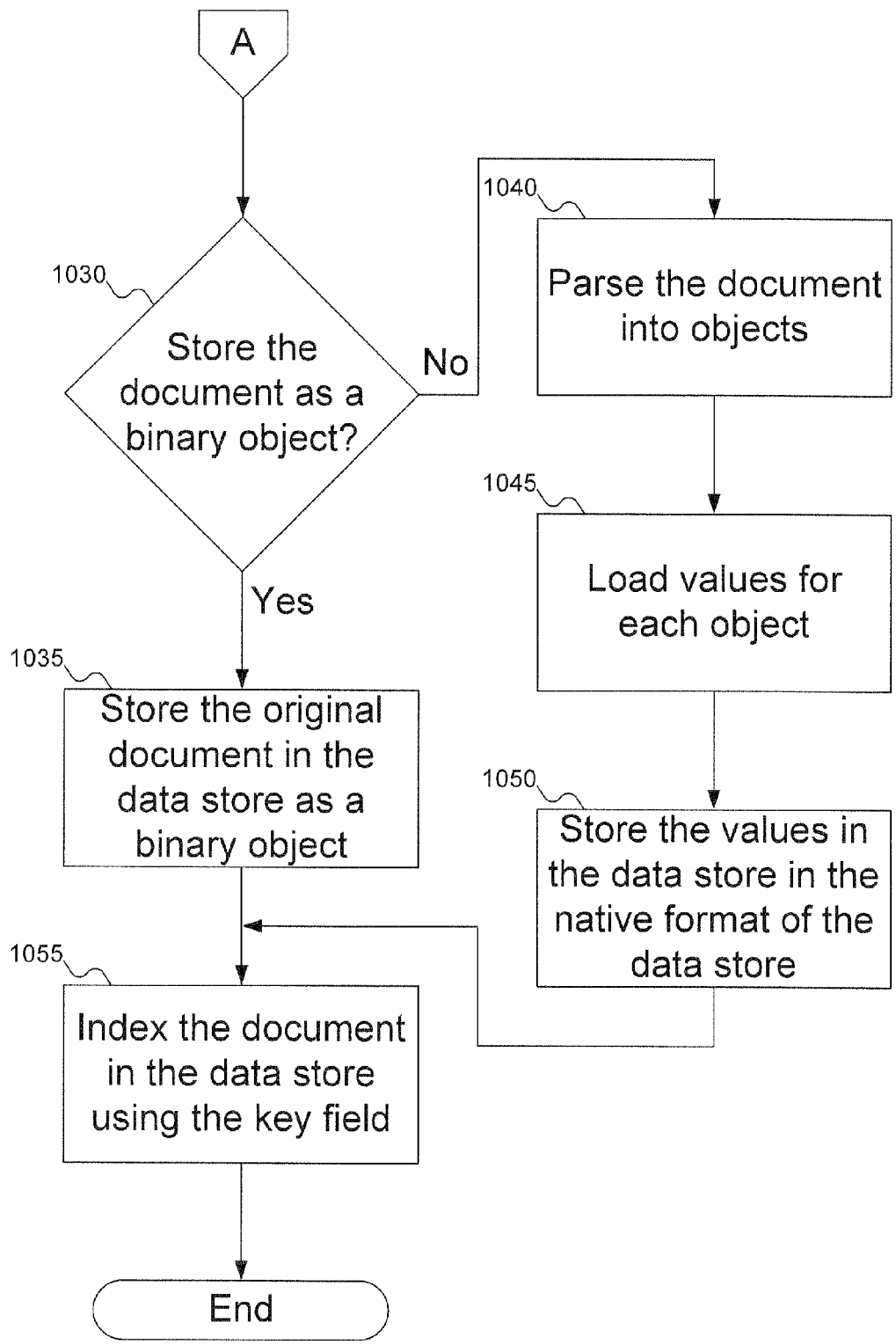

FIGS. 10A-10B show a flowchart of the procedure for storing a document in the data store of FIG. 7, according to an embodiment of the invention. In FIG. 10A, at step 1005, the system accesses a schema for a document. At step 1010, the system determines a key field in the schema. At step 1015, the system locates the key field in the document. At step 1020, the system loads the value from the key field in the document. At step 1025, the system stores the value in the data store.

At step 1030 (FIG. 10B), the system determines if the document is being stored as a binary object. If so, then at step 1035, the system stores the original document in the data store as a binary object. Otherwise, at step 1040, the system parses the document into objects. At step 1045, the system loads values for each from the document, and at step 1050, the system stores the values in the data store, in the native format of the data store. Finally, at step 1055, regardless of whether the data store holds the document as a binary object or in native format, at step 1055, the system indexes the document in the data store using the key field.

Although FIG. 10B suggests that documents are stored either as binary objects or in the native format of the data store, other combinations are possible. For example, the data store can duplicate some of the objects of the document into native format, but not all. Or the data store can duplicate all of the objects of the document into native format, but also store the document as a BLOB. A person skilled in the art will recognize other possible combinations.

Figure 11A:
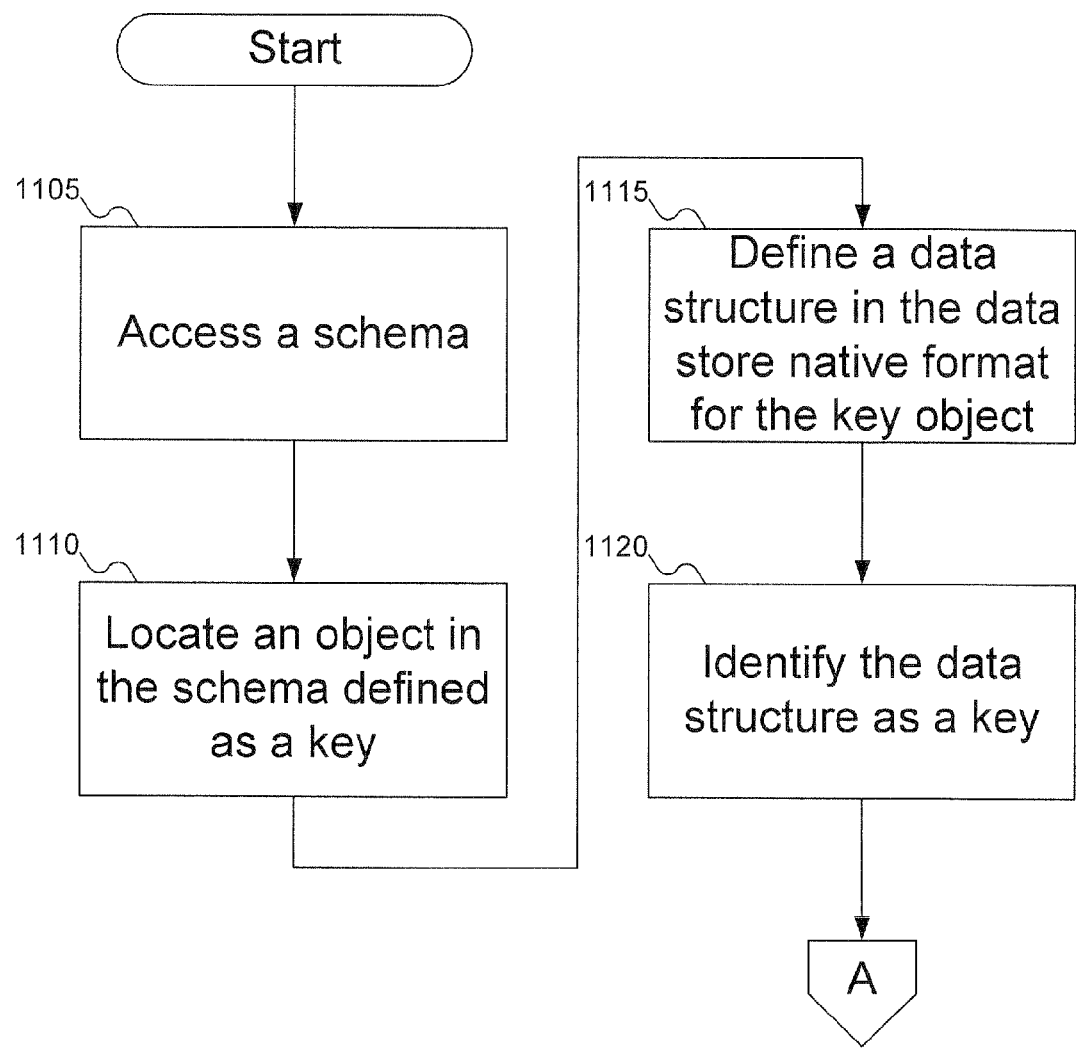
FIGS. 11A-11B show a flowchart of the procedure for defining the structure of the data store of FIG. 7, according to an embodiment of the invention.
Figure 11B:
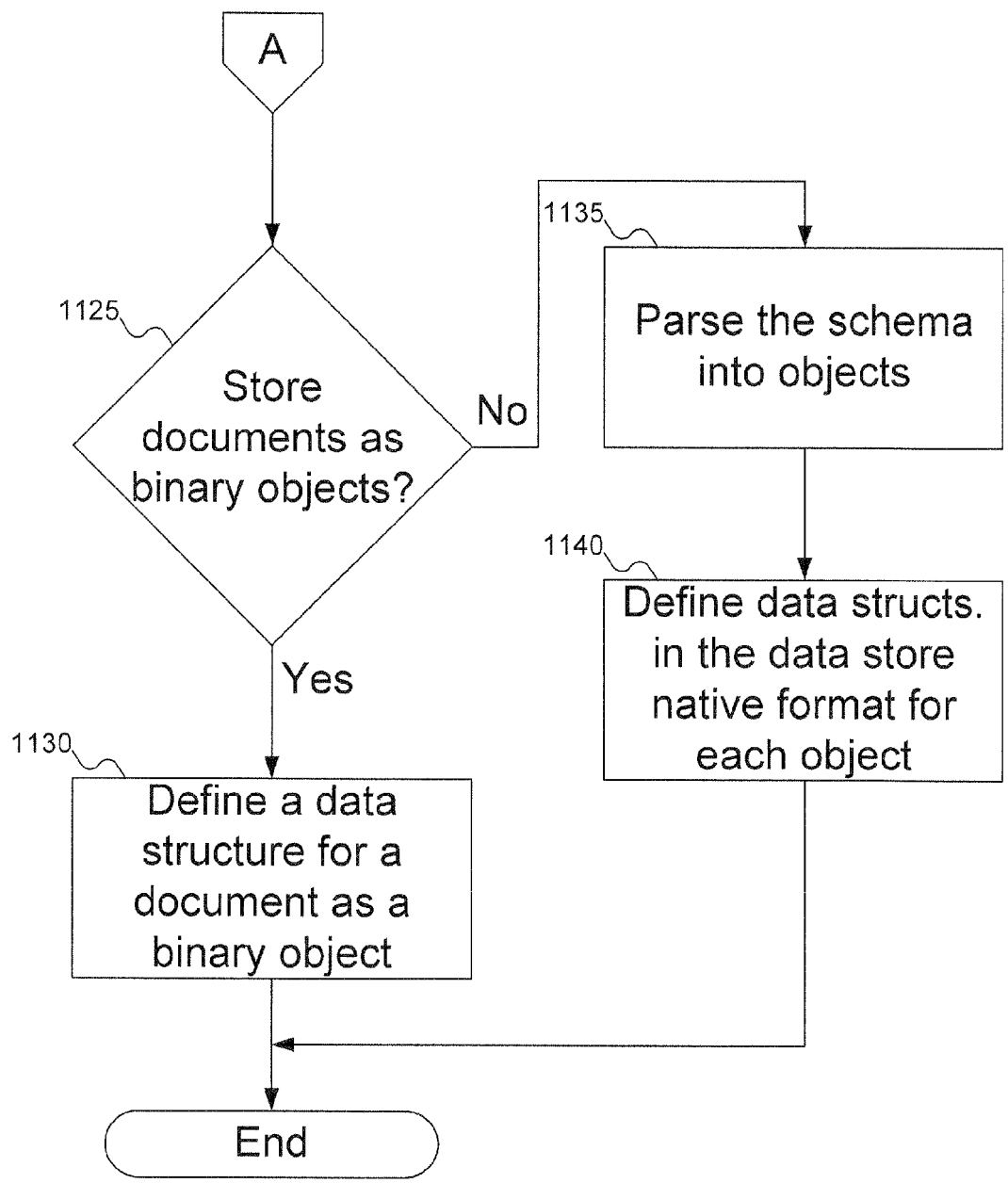

FIGS. 11A-11B show a flowchart of the procedure for defining the structure of the data store of FIG. 7, according to an embodiment of the invention. In FIG. 11A, at step 1105, the system accesses a schema. As discussed above with reference to FIGS. 2A-2C, the XML document can identify the schema which it satisfies, or the application can independently identify the XML schema to apply. At step 1110, the system locates an object in the schema that is defined as a key. At step 1115, the system defines a data structure in the data store, in the native format of the data store, to hold values from the key field in documents. At step 1120, the system identifies the data structure as a key of the data store. Steps 1115 and 1120 are performed using the tools of the data store: specifics depend on the operation of the data store, and are beyond the scope of this document.

At step 1125 (FIG. 11B), the system determines if the document is being stored as a binary object. If so, then at step 1130, the system defines a data structure to hold documents as binary objects. Otherwise, at step 1135, the system parses the schema into objects, and at step 1140, the system defines data structures in the data store, in the native format of the data store, to hold values for each object.

As with FIG. 10B, FIG. 11B suggests that either the data store holds the document as a binary object or in native format. A person skilled in the art will recognize that other combinations are possible.

Figure 12A:
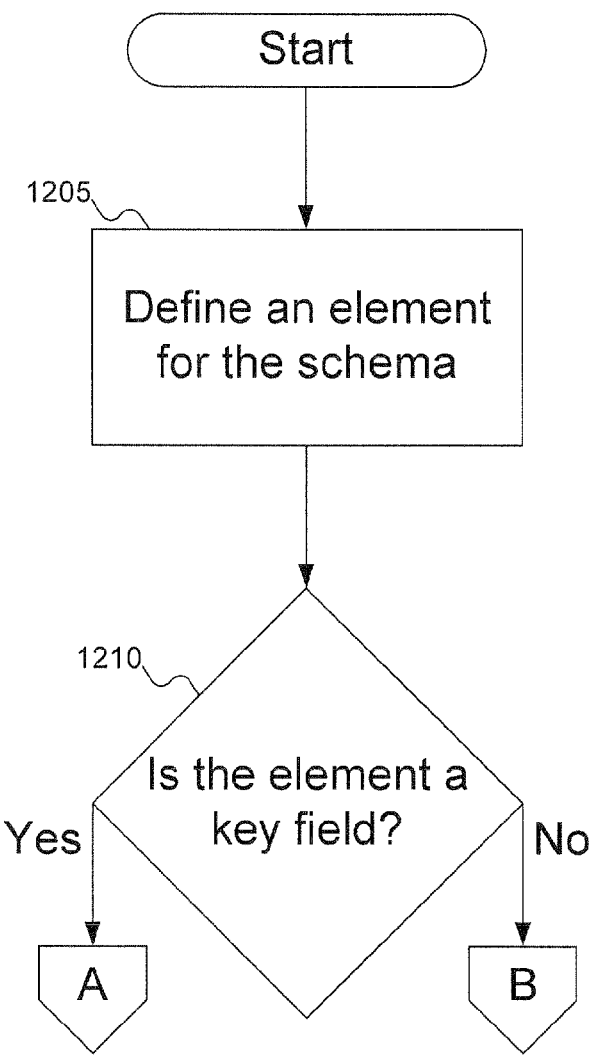
FIGS. 12A-12D show a flowchart of the procedure for defining a schema that can be used in conjunction with the data store of FIG. 7, according to an embodiment of the invention.
Figure 12B:
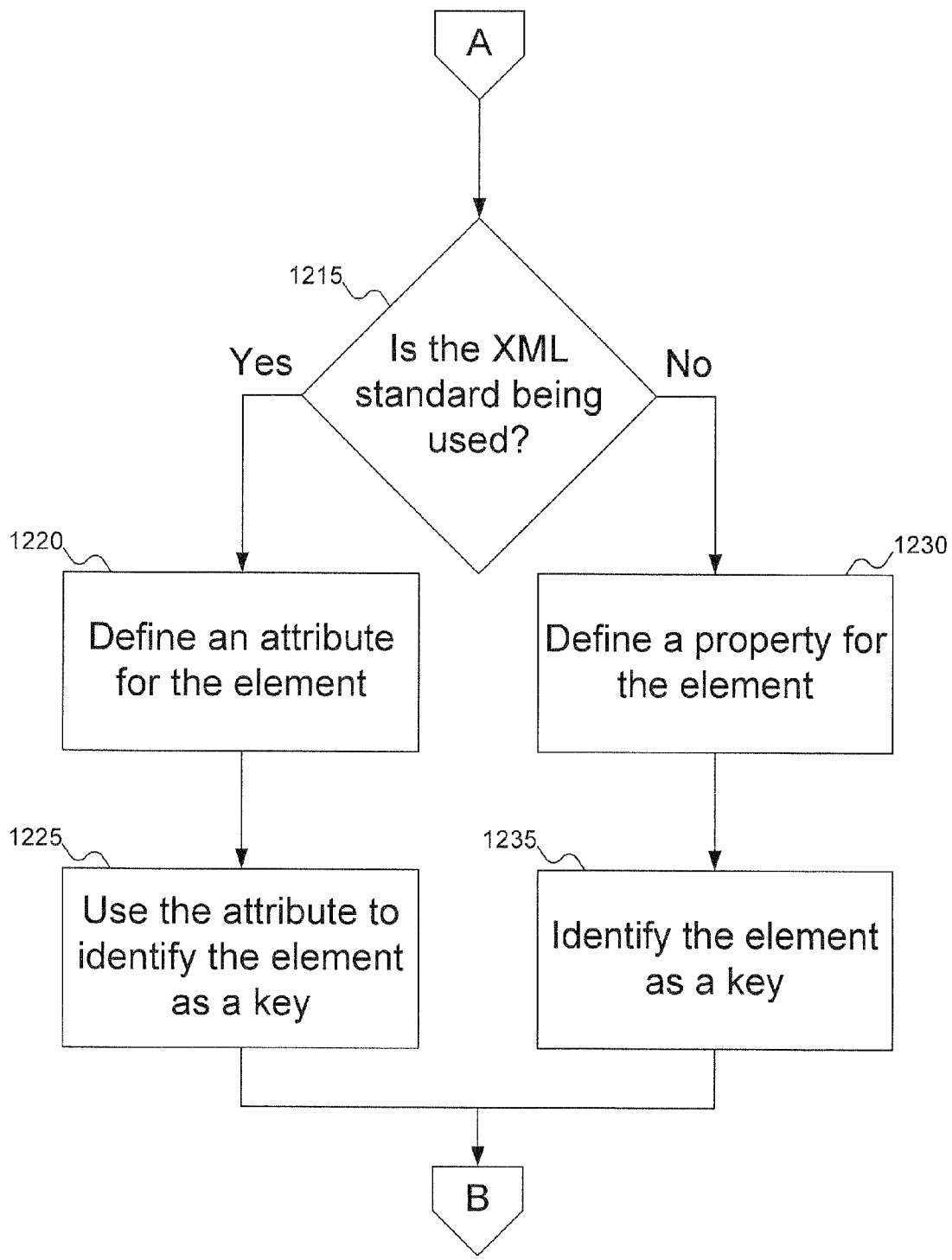

FIGS. 12A-12B show a flowchart of the procedure for defining a schema that can be used in conjunction with the data store of FIG. 7, according to an embodiment of the invention. In FIG. 12A, at step 1205, a user defines an element for a schema. At step 1210, the user decides if the element is to be a key field for the schema. If the element is to be a key field for the schema, then at step 1215 (FIG. 12B), the user decides if the XML schema standard in existence at the time this document was written (http:##www.w3.org#TR#xmlschema-0#, which does not support element properties), is to be followed.

If the user will follow the current XML schema standard, then at step 1220, the user defines an attribute for the element, and at step 1225, the user uses the attribute to identify the element as a key (along with the key type for the element: primary, secondary, or foreign). If the user is not following the current XML schema standard, then at step 1230, the user defines a property for the element, and at step 1235 the user uses the property to identify the element as a key (along with the key type). A person skilled in the art will recognize that if the XML standard is modified to support properties such as key types, then the decision point at step 1215 can be eliminated (unless the user were to follow an older XML schema standard), and progress can continue immediately along steps 1230-1235 (that is, steps 1220-1225 are not needed).

Figure 12C:
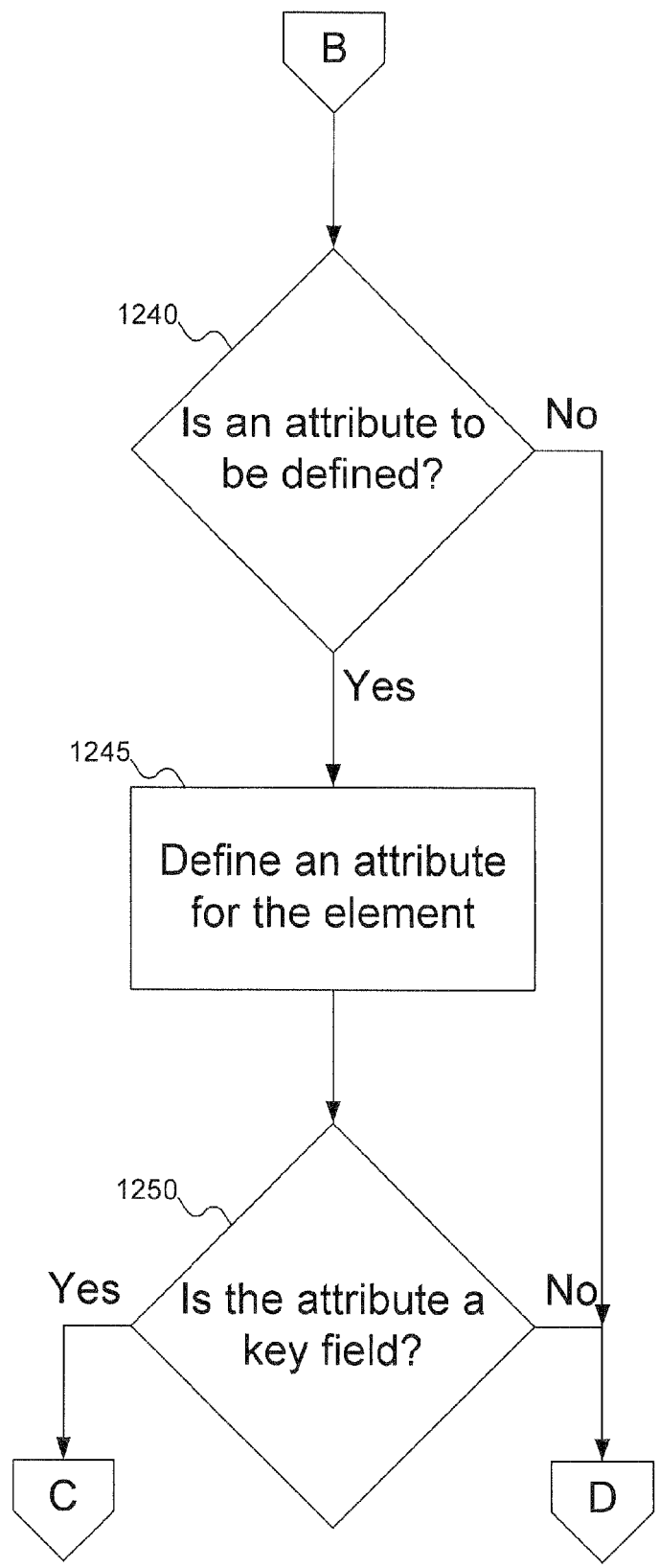

At step 1240 (FIG. 12C), whether or not the user defined the element as a key, the user decides if an attribute of the element is to be defined. Note that if the user did not make the element a key field, the user must define an attribute. If the user is to define an attribute, then at step 1245 the user actually defines the attribute. At step 1250, the user decides whether the attribute is to be a key field. Again, if the user did not make the element a key field, then the user must make the attribute a key field.

Figure 12D:
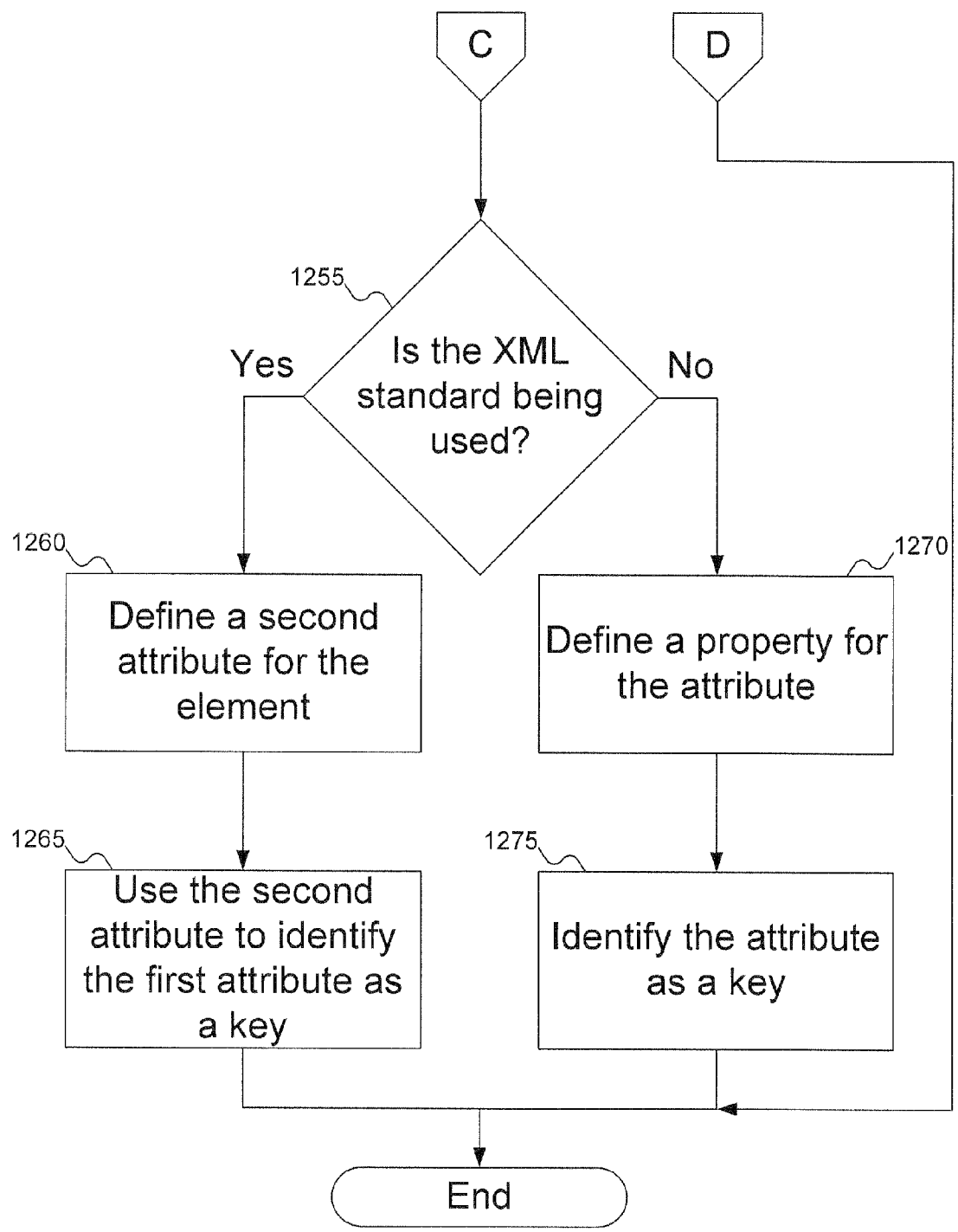

At step 1255 (FIG. 12D), the user decides if the XML schema standard in existence at the time this document was written (http:##www.w3.org#TR#xmlschema-0#, which does not support attribute properties), is to be followed. If the user will follow the current XML schema standard, then at step 1260, the user defines a second attribute for the element, and at step 1265, the user uses the second attribute to identify the first attribute as a key (along with the key type for the first attribute: primary, secondary, or foreign). If the user is not following the current XML schema standard, then at step 1270, the user defines a property for the attribute, and at step 1275 the user uses the property to identify the attribute as a key (along with the key type). A person skilled in the art will recognize that if the XML standard is modified to support properties such as key types, then the decision point at step 1255 can be eliminated (unless the user were to follow an older XML schema standard), and progress can continue immediately along steps 1270-1275 (that is, steps 1260-1265 are not needed).

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A method for defining a data store in a computer, comprising:
    accessing an eXtensible Markup Language (XML) document;
    accessing an eXtensible Markup Language (XML) schema associated with the XML document;
    locating an object defined in the XML schema as a key;
    defining a first data structure in the data store for the object in a native format of the data store;
    identifying the first data structure in the data store as a key data structure;
    defining a second data structure in the data store for a generic document conforming to the XML schema, wherein the generic document is an XML document, including:
        parsing the XML schema into objects; and
        defining a data structure in the data store for each object;
    copying a value from an XML document using the XML schema into the first data structure, the value corresponding to the object defined in the XML schema as the key; and
    storing the XML document in the second data structure.

2. A method according to claim 1 wherein defining a data structure in the data store for each object includes defining the data structure in the data store for each object in a native format of the data store.

3. A computer-readable medium containing a program to define a data store, comprising:
    software to access an eXtensible Markup Language (XML) document;
    software to access an eXtensible Markup Language (XML) schema;
    software to locate an object defined in the XML schema as a key associated with the XML document;
    software to define a first data structure in the data store for the object in a native format of the data store;
    software to identify the first data structure in the data store as a key data structure;
    software to define a second data structure in the data store for a generic document conforming to the XML schema, wherein the generic document is an XML document, including:
        software to parse the XML schema into objects;
        software to define a data structure in the data store for each object;
    software to copy a value from an XML document using the XML schema into the first data structure, the value corresponding to the object defined in the XML schema as the key; and
    software to store the XML document in the second data structure.

4. A method according to claim 3 wherein the software to define a data structure in the data store for each object includes software to define the data structure in the data store for each object in a native format of the data store.

* * * * *

UNITED STATES PATENT AND TRADEMARK OFFICE
CERTIFICATE OF CORRECTION

| | | |
|---|---|---|
| PATENT NO. | : 8,255,432 B2 | |
| APPLICATION NO. | : 11/932682 | |
| DATED | : August 28, 2012 | |
| INVENTOR(S) | : Ackerman et al. | |

It is certified that error appears in the above-identified patent and that said Letters Patent is hereby corrected as shown below:

On title page, in column 2, under "Other Publications", line 2, delete "soncisoftware" and insert -- sonicsoftware --, therefor.

On page 2, in column 2, under "Other Publications", line 10, delete "Systms" and insert -- Systems --, therefor.

In column 1, line 65, delete "(Copyright®2001" and insert -- (Copyright©2001 --, therefor.

In column 6, line 33, delete "identity" and insert -- identify --, therefor.

Signed and Sealed this
Eighteenth Day of December, 2012

David J. Kappos
*Director of the United States Patent and Trademark Office*